(12) United States Patent
Shin et al.

(10) Patent No.: US 7,839,376 B2
(45) Date of Patent: Nov. 23, 2010

(54) TIME CONTROL CIRCUIT FOR BACKLIGHT INVERTER

(75) Inventors: Sang Cheol Shin, Kyungki-do (KR); Byoung Own Min, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 995 days.

(21) Appl. No.: 11/423,123

(22) Filed: Jun. 8, 2006

(65) Prior Publication Data

US 2006/0284577 A1  Dec. 21, 2006

(30) Foreign Application Priority Data

Jun. 15, 2005  (KR) .................. 10-2005-0051612

(51) Int. Cl.
  *G09G 3/36* (2006.01)
  *G05F 1/00* (2006.01)
(52) U.S. Cl. ...................... 345/102; 323/288
(58) Field of Classification Search ............... 315/360, 315/291, 299; 345/87–104; 323/282–290
  See application file for complete search history.

(56) References Cited

U.S. PATENT DOCUMENTS

| | | | | | |
|---|---|---|---|---|---|
| 5,581,433 | A | * | 12/1996 | Jordan | 361/93.2 |
| 5,670,993 | A | * | 9/1997 | Greene et al. | 345/556 |
| 6,100,678 | A | * | 8/2000 | Hobrecht | 323/288 |
| 6,215,255 | B1 | * | 4/2001 | Kim et al. | 315/291 |
| 7,471,050 | B2 | * | 12/2008 | Shimada et al. | 315/291 |
| 2006/0022916 | A1 | * | 2/2006 | Aiello | 345/82 |
| 2006/0208989 | A1 | * | 9/2006 | Kuo et al. | 345/98 |

FOREIGN PATENT DOCUMENTS

| | | | |
|---|---|---|---|
| JP | 2001-211638 A | | 8/2001 |
| JP | 2004-023948 | * | 1/2004 |
| JP | 2004023948 | | 1/2004 |
| JP | 2004-147418 A | | 5/2004 |
| KR | 2002-17358 | | 3/2002 |
| KR | 2002-0017358 | * | 3/2002 |
| WO | WO2005/057543 | * | 6/2005 |

OTHER PUBLICATIONS

Japanese Patent Office Office Action issued Jan. 6. 2009.
Korean Intellectual Patent Office, Office Action, mailed Aug. 28, 2006.

* cited by examiner

*Primary Examiner*—Alexander Eisen
*Assistant Examiner*—Kenneth Bukowski
(74) *Attorney, Agent, or Firm*—Lowe Hauptman Ham & Berner LLP (57) ABSTRACT

In a time control circuit, a capacitor is connected between a connecting pin and a ground. A first current source supplies a first current to the connecting pin. A first comparator element has a non-inverse terminal connected to a voltage of the capacitor and a pre-set first reference voltage, and controls the initial startup time. A second comparator element has an inverse terminal connected to the voltage of the capacitor and a pre-set second reference voltage, and controls the soft start time. Further, a current bypass controller includes a current bypass path between the connecting pin and the ground, which connects the current bypass path after the soft start time and blocks it at an input of a protective signal. Additionally, a third comparator element has an inverse terminal connected to the voltage of the capacitor and a pre-set third reference voltage, and controls the shutdown time.

10 Claims, 5 Drawing Sheets

TIME CONTROL CIRCUIT FOR BACKLIGHT INVERTER

CLAIM OF-PRIORITY

This application claims the benefit of Korean Patent Application No. 2005-51612 filed on Jun. 15, 2005 in the Korean Intellectual Property Office, the disclosure of which is incorporated herein by reference.

BACKGROUND OF THE INVENTION

1. Field of the Invention

The present invention relates to a time control circuit for a backlight inverter applied to displays such as LCD. More particularly, the invention relates to a time control circuit for a backlight inverter capable of controlling an initial startup time, a soft start time and a shutdown time via an externally connectable capacitor for time-setting, thereby decreasing the number of pins connected to the capacitor and consequently reducing manufacturing costs.

2. Description of the Related Art

In general, with an increasingly bigger market for LCD TVs and LCD monitors, a greater number of lamps have been mounted on a backlight unit. Also, increasingly larger and longer tubes of the lamps have diversified methods for driving the lamps.

Especially, lately, to lower price of the applications, vast attentions have been drawn on ways to save costs for manufacturing a backlight inverter.

Figure 1:
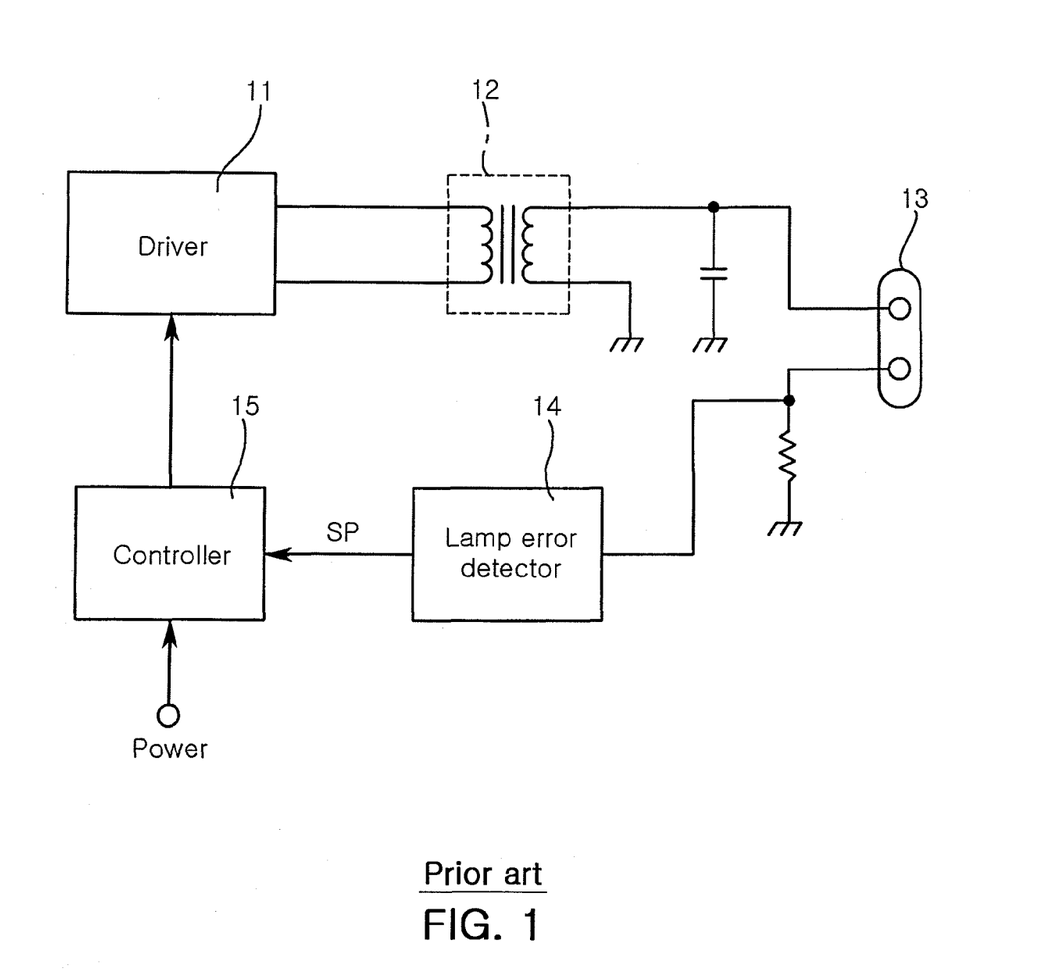
FIG. 1 is a configuration diagram illustrating a conventional backlight inverter.

FIG. 1 is a configuration diagram illustrating a backlight inverter according to the prior art. Referring to FIG. 1, the conventional backlight inverter includes a driver 11, a transformer 12, a lamp error detector 14 and a controller 15. The driver 11 generates a square wave signal based on detected lamp current. The transformer 12 raises the voltage of the square wave signal from the driver 11 and converts the signal into an alternating current signal to output alternating current necessary for lamp operation to the lamp 13. The lamp error detector 14 has a feedback node connected to a cold terminal of the lamp 13 to detect current (or voltage) traveling through the lamp 13 and detecting lamp errors such as openness of a voltage lamp based on the detected value to provide a protective signal. The controller 15 controls the operation of the driver 11 based on detected voltage of the lamp error detector 14, and controls the deactivation of the driver 11 in response to the protective signal. Herein, an input terminal of the lamp with high current supplied is referred to as a hot terminal whereas an input terminal of the lamp with low current supplied is referred to as a cold terminal.

In this backlight inverter, the controller 15, typically configured as an inverter control IC, controls an initial startup time T1 at power-on, then controls a soft start time T2, and a shutdown time T3 at an input of a protective signal. To control such three times T1, T2 and T3, the conventional time control circuit for the backlight inverter is configured as shown in FIG. 2.

Figure 2:
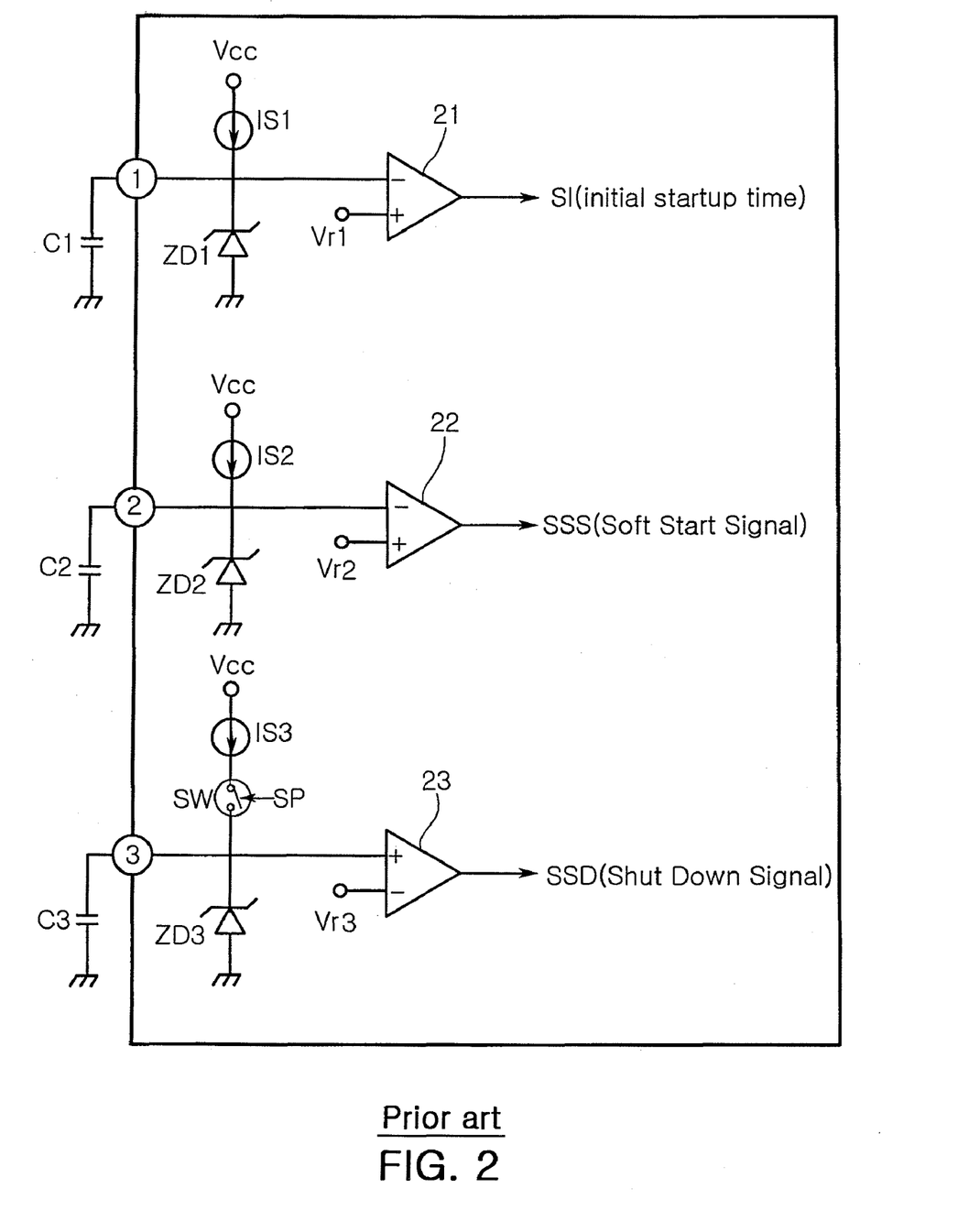
FIG. 2 is a diagram illustrating a conventional time control circuit for a backlight inverter.

FIG. 2 shows a time control circuit of a backlight inverter according to the prior art.

The conventional time control circuit of the backlight inverter includes first to third comparator elements 21 to 23. The first comparator element 21 belonging to the controller 15 has an inverse terminal connected to a first capacitor C1 through a first pin P1 and a non-inverse terminal connected to a first reference voltage Vr1 (about 0.3V) for controlling the initial startup time T1 to compare voltages of the both terminals to provide an initial startup signal SI. The second comparator element 22 has an inverse terminal connected to a second capacitor C2 through a second pin P2 and a non-inverse terminal connected to a second reference voltage Vr2 (about 0.7V) for controlling a soft start time T2 to compare voltages of the both terminals to provide a soft start signal SSS. The third comparator 23 has a non-inverse terminal connected to a third capacitor C3 through a third pin P3 and an inverse terminal connected to a third reference voltage Vr3 (about 1.5V) for controlling a shutdown time T3 for lamp errors such as open lamp to compare voltages of the both terminals to provide a shutdown signal SSD.

Also, the time control circuit includes first to third current sources IS1 to IS3 connected between the non-inverse terminals of the respective comparators 21 to 23 and power Vcc terminals; first to third zenor diodes ZD1 to ZD3 connected between the non-inverse terminals of the respective comparators 21 to 23 and a ground; and a protective switch SW connected between the third current source IS3 and the non-inverse terminal of the third comparator element 23 for switching on in response to a protective signal.

Figure 3:
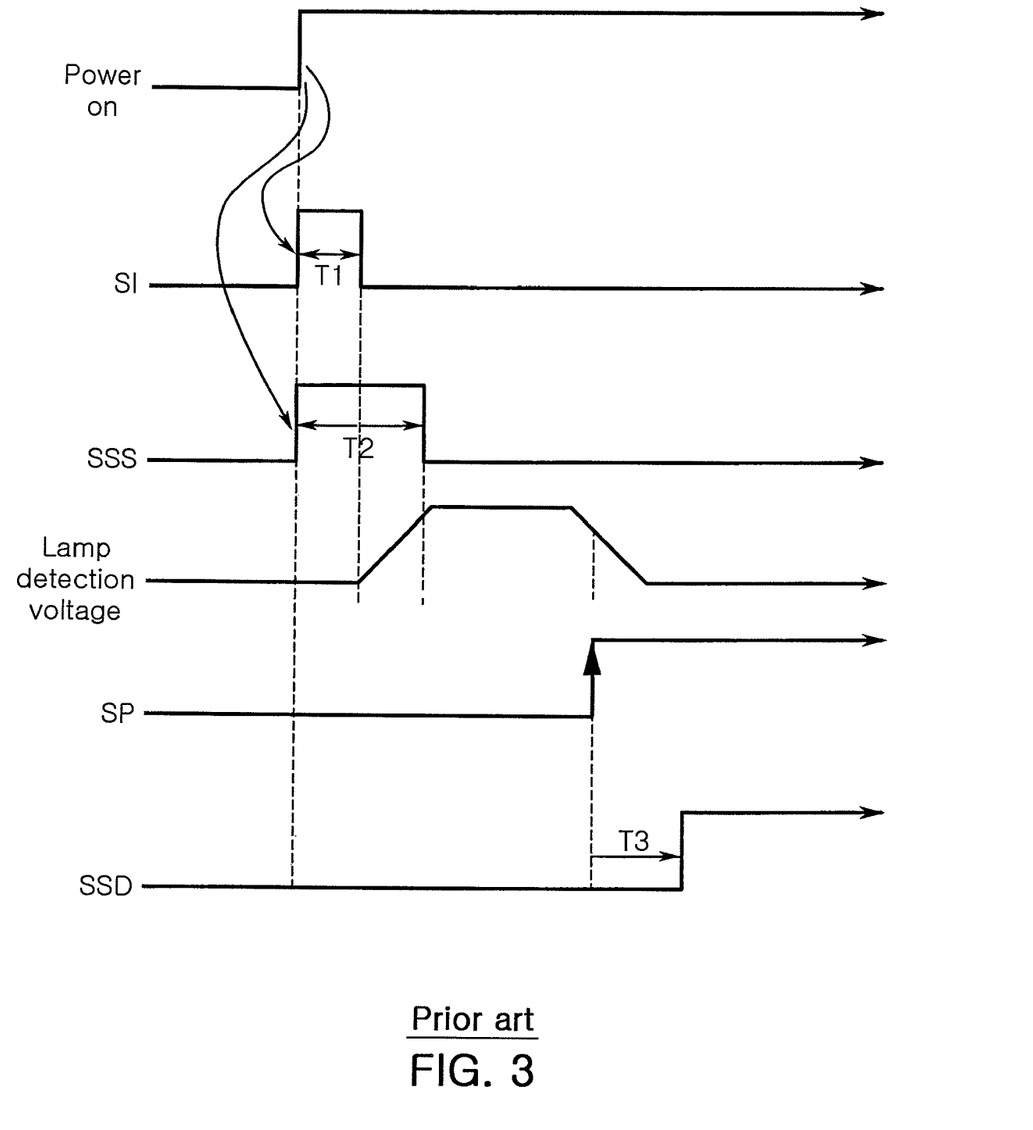
FIG. 3 is a timing chart illustrating major signals of FIG. 2.

FIG. 3 is a timing chart illustrating major signals of FIG. 2.

Referring to FIG. 3, in a system employing the time control circuit for the backlight inverter of FIG. 2, at power-on, a high-level signal is inputted from the first comparator element 21. Then, current from the first current source IS1 connected to the power Vcc is charged on the first capacitor C1. If the voltage charged on the capacitor C1 reaches the first reference voltage Vr1 of 0.3V or more, the first comparator element 21 outputs a low level signal. Through this process, the initial startup time T1 is set during a predetermined duration (e.g., 10 msec) from the time point of power-on.

In addition, in case of power-on in the system, the second comparator element 22 outputs a high level signal. Then current from the second current source IS2 by the power Vcc is charged on the second capacitor C2. If the voltage charged on the second capacitor C2 reaches the second reference voltage Vr2 of 0.7V or more, the second comparator element 22 outputs a low level signal. Through this process, a soft start time T2 is set during a predetermined duration (e.g. 23 msec) from the time point of power-on.

Further, in the system adopting the time control circuit of FIG. 2, if an error signal SOL of lamp operation such as open lamp is inputted, a switch SW is on. Thereby, current from a third current source IS3 is charged on the third capacitor C3. If the voltage charged on the third capacitor C3 reaches a third reference voltage Vr3 of 1.5V or more, the third comparator 23 outputs a high level signal. Through this process, a shutdown time T3 is set.

In this fashion, the conventional time control circuit for the backlight inverter requires the aforesaid three kinds of time controls to drive a backlight such as CCFL. To achieve such three kinds of time controls, respective capacitors are coupled to respective three pins.

However, since the conventional time control circuit for the backlight inverter requires three externally connectable capacitors for the three time controls and three connecting pins for connecting three capacitors, production costs are increased, thus disadvantageously leading to higher production costs of the applications.

SUMMARY OF THE INVENTION

The present invention has been made to solve the foregoing problems of the prior art and therefore an object according to certain embodiments of the present invention is to provide a time control circuit for a backlight inverter applied to displays such as LCD, which can control an initial startup time, a soft start time and a shutdown time via an externally connectable capacitor for time-setting, thereby decreasing pins connected to an external capacitor and consequently reducing production costs.

According to an aspect of the invention for realizing the object, there is provided a time control circuit for a backlight inverter comprising: a capacitor connected between a connecting pin and a ground; a first current source connected between the connecting pin and an power terminal, for supplying a pre-set first current; a first comparator element for comparing a voltage of the capacitor and a pre-set first reference voltage to control an initial startup time; a second comparator element for comparing the voltage of the capacitor and a pre-set second reference voltage to control a soft start time; a current bypass controller including a current bypass path formed between the connecting pin and the ground, for connecting the current bypass path after the soft start time and blocking the current bypass path at an input of a protective signal; and a third comparator element for comparing the voltage of the capacitor and a pre-set third reference voltage to control a shutdown time.

Also, the time control circuit for the backlight inverter further comprises a constant voltage element connected to the connecting pin, for supplying a pre-set constant voltage.

The time control circuit for the backlight inverter further comprises a second current source having one end connected to the power terminal, for supplying a pre-set second current; and a first switch connected between the other end of the second current source and the connecting pin, for switching off after the soft start time determined by the second comparator element.

The second reference voltage is set higher than the first reference voltage and lower than the third reference voltage.

The constant voltage of the constant voltage element is set higher than the third reference voltage.

The first current of the first current source is set lower than the second current of the second current source.

The first comparator element is disabled after the soft start time determined by the second comparator element.

The second comparator element comprises a comparator for comparing the voltage of the capacitor and the second reference voltage, and a first latch for outputting an output signal from the comparator, the first latch being reset at power-off.

The third comparator element comprises a comparator for comparing the voltage of the capacitor and the third reference voltage, and a second latch for outputting an output signal from the comparator, the second latch being reset at power-off.

The bypass controller comprises a second switch connected between the connecting pin and the ground, and a logical, operation element for logically sum up a first protective signal and a second protective signal so as to provide a switching signal to the second switch, the logical operation element being enabled after the soft start time determined by the second comparator element.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings, in which the same reference numerals are used through the different drawings to designate the same or similar components.

Figure 4:
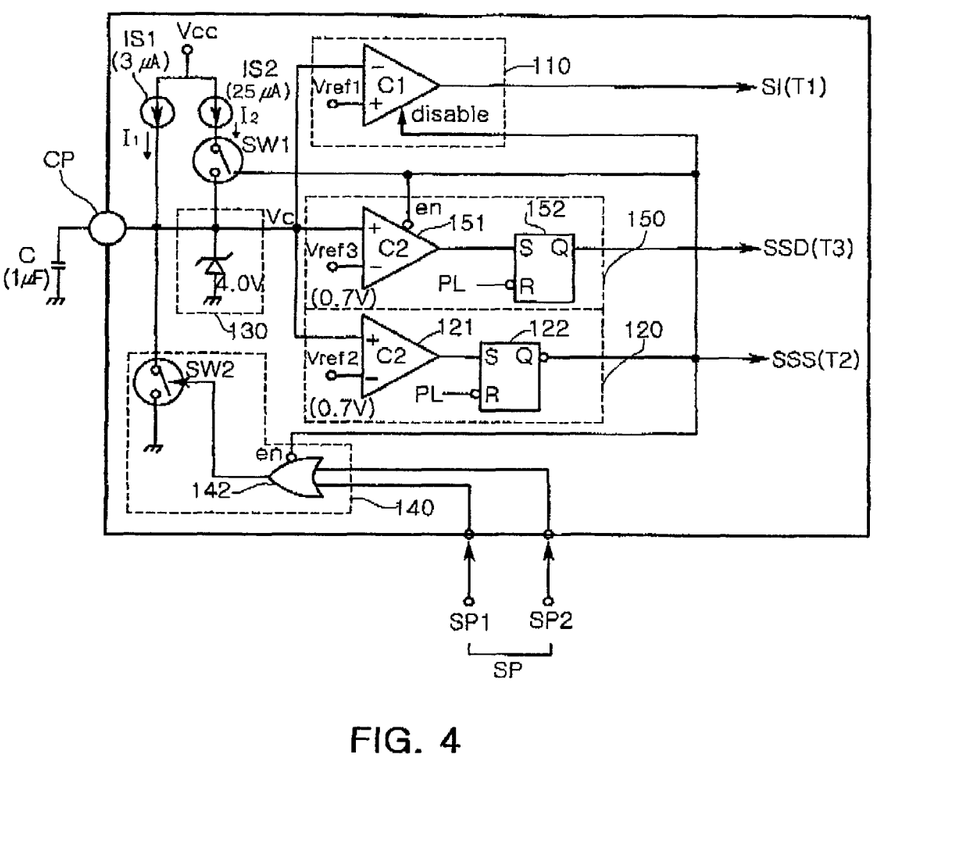
FIG. 4 is a diagram illustrating a time control circuit for a backlight inverter according to the invention.

FIG. 4 is a diagram illustrating a time control circuit for a backlight inverter according to the invention.

Referring to FIG. 4, the time control circuit for the backlight inverter of the invention includes a capacitor C, a first comparator element 110, a second comparator element 120, a constant voltage element 130, a current bypass controller 140, a third comparator element 150, a second current source IS2 and a first switch SW1.

The capacitor C is connected between a connecting pin and a ground, and connected to the respective elements through the connecting pin. The capacitor C is charged with a first current I1 supplied from the first current source IS1 or/and a second current I2 supplied from the second current source IS2, and then supplies the charged voltage Vc to the respective elements.

The first current source IS1, connected between the connecting pin CP and a power terminal Vcc, supplies the pre-set first current I1. The second current source IS2, having an end connected to the power terminal Vcc, supplies the pre-set second current I2.

The first switch SW1, connected between the other end of the second current source IS2 and the connecting pin CP, switches off after a soft start time T2 determined by the second comparator element 120.

The first comparator element 110 has an inverse terminal connected to the capacitor C through the connecting pin CP and a non-inverse terminal connected to a pre-set first reference voltage Vref1, and compares voltages applied through the both terminals to control an initial startup time T1.

The second comparator element 120 has a non-inverse terminal connected to the capacitor C through the connecting pin CP and an inverse terminal connected to a pre-set second reference voltage Vref2, and compares voltages applied through the both terminals to control a soft start time T2. At this time, the first comparator element 110 is disabled after the soft start time T2 determined by the second comparator element 120.

The constant voltage element 130, connected to the connecting pin, supplies a pre-set constant voltage. The constant voltage element 130 may be simply constructed of a zenor diode.

The current bypass controller 140 includes a current bypass path formed between the connecting pin CP and a ground. At power-on, the current bypass controller 140 blocks the current bypass path and allows current to flow through it after the soft start time T2 controlled by the second comparator element 120. Meanwhile, at an input of a protective signal SP, the current bypass controller 140 blocks the current bypass path.

The third comparator element 150 has a non-inverse terminal connected to the connecting pin CP and an inverse terminal connected to a pre-set third reference voltage Vref3, and compare s voltages applied through the both terminals to control a shutdown time T3. At this time, the second reference voltage Vref2 is set higher than the first reference voltage Vref and lower than the third reference voltage Vref3. Further, the constant voltage of the constant voltage element 130 is set higher than the third reference voltage Vref3. For example, in case where the first reference voltage Vref1 is set at about 0.3V, the second reference voltage Vref2 is s et at about 0.7V, the third reference voltage Vref3 is set at about 3.0V and the constant voltage is set at about 4.0V.

The first current I1 of the first current source IS1 is set lower than the second current I2 of the second current source IS2. For example, in case where the first current I1 is set at about 3 µA, the second current I2 is set at about 25 µA.

In addition, the second comparator element 120 includes a comparator 121 for comparing the voltage of the capacitor with the second reference voltage Vref2 and a first latch 122 for latching an output signal from the comparator 121. The first latch is reset at power-off by being connected to power line (PL).

The third comparator 150 includes a comparator 151 for comparing the voltage applied through the non-inverse terminal and a third reference voltage Vref3 applied through the inverse terminal and a second latch 152 for latching an output signal of the comparator 151. The second latch 152 is reset at power-off by being connected to power line (PL).

The current bypass controller 140 includes a second switch SW2 connected between the connecting pin CP and the ground, and a logical operational element 142 for logically summing up a first protective signal SP1 and a second protective signal SP2 to supply a switching signal to the second switch SW2, the logical operational element being enabled after the soft start time T2 determined by the second comparator element 120.

Figure 5:
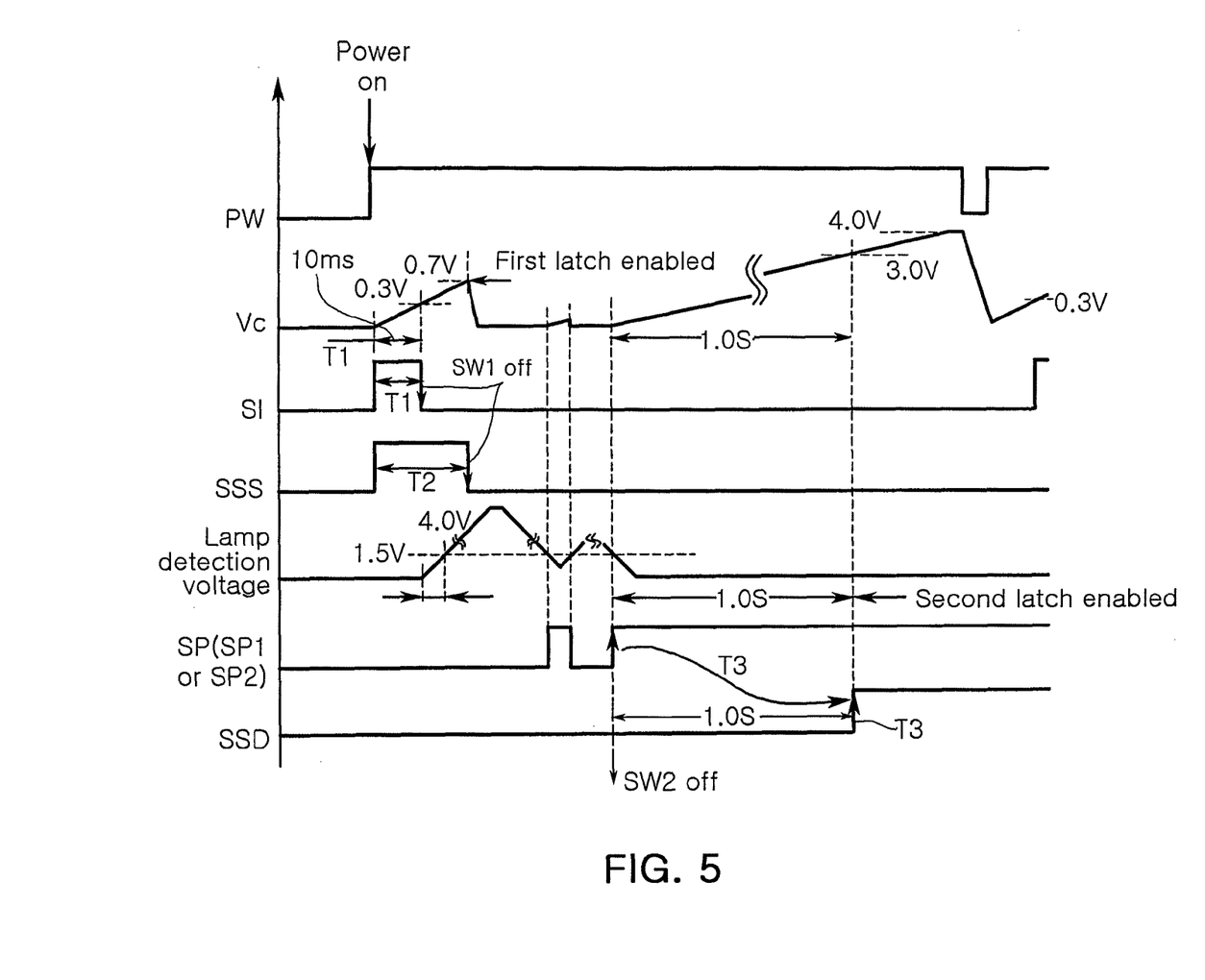
FIG. 5 is a timing chart illustrating major signals of FIG. 4.

FIG. 5 is a timing chart illustrating major signals of FIG. 4.

Referring to FIG. 5, PW denotes power on/off, Vc denotes a voltage charged by a capacitor C, SI denotes an initial startup signal, SSS denotes a soft start signal, and a lamp detection voltage denotes a voltage converted from a current of the lamp. SP denotes a protective voltage applied in case where the lamp detection voltage is at a low level during a predetermined time. SSD denotes a shutdown signal.

Operations and effects of certain embodiments of the invention will be explained in detail hereunder with reference to the accompanying drawings.

A time control circuit for a backlight inverter of the invention belongs to a controller of the backlight inverter. The time control circuit for the backlight inverter controls an initial startup time T1 and a soft start time T2 at power-on and a shutdown time T3 to protect a system in case of errors of a backlight lamp. An explanation will be given about a process of controlling the initial startup time T1, soft start time T2 and shutdown time T3 with reference to FIGS. 4 and 5.

First, a process of controlling the initial startup time T1 will be explained.

Referring to FIG. 4, if power is supplied to the system, the first switch SW1 is in an 'on' state and the second switch SW2 is in an 'off' state at an early stage. At this time, a first current I1 supplied from the first current source IS1 and a second current I2 supplied from the second current source IS2 travel to the capacitor C through the connecting pin CP. Then, accordingly a voltage begins to be charged on the capacitor C. The voltage Vc charged on the capacitor C is gradually increased.

At power-on, the charged voltage Vc connected to an inverse (−) terminal of the first comparator element 110 is lower than a first reference voltage Vref1 connected to a non-inverse (+) terminal of the first comparator element 110. Therefore, at power-on, the first comparator element outputs a high level signal.

Thereafter, with the charged voltage Vc gradually raised, when the charged voltage Vc reaches the first reference voltage Vref1 or more, the first comparator element 110 outputs an initial startup signal SI which is transited from a high-level into a low level. Herein, a duration at which the output level of the first comparator element 110 is transited from the high level into the low level corresponds to the initial startup time T1.

For example, referring to FIGS. 4 and 5, in case where the first current I1 supplied by the first current source IS1 is about 3 µA and the second current I2 supplied by the second current source IS2 is about 25 µA, a relatively big sum current of about 28 µA travels to the capacitor C. Therefore, the voltage Vc charged on the capacitor C immediately surpasses the first reference voltage Vref1. At this time, in case where the first reference voltage Vref1 is 0.3V and the capacitor C is of about 1 µF, at about 10 msec from a time point that the capacitor C is charged by the sum current (I1+I2), the voltage charged on the capacitor becomes higher than the first reference voltage Vref1 of 0.3V.

Therefore, the first comparator element 110 outputs a high level signal at power-on and outputs a low level signal with elapse of about 10 msec from a time point of power-on.

The aforesaid initial startup time control operation is conducted simultaneously with a process of controlling the soft start time T2, which will be explained hereunder.

An explanation will be given about the process of controlling the soft start time T2.

Referring to FIG. 4, at power-on, the charged voltage Vc connected to a non-inverse (+) terminal of the comparator 121 of the second comparator element 120 is lower than the second reference voltage Vref2 connected to a non-inverse (−) terminal of the comparator 121. Therefore, the comparator 110 outputs a low level signal. The low level voltage is level-inverted and latched by the first latch 122 so that the second comparator element 120 outputs a high level signal at power-on.

Then when the charged voltage Vc is increasingly boosted and becomes higher than the second reference voltage Vref2, the output of the comparator 110 is transited from a low level into a high level. The high level signal is level-inverted and latched by the first latch 122 so that the second comparator element 120 outputs the soft start signal SSS. Herein, a duration at which the output level of the second comparator element 120 is transited from a high level to a low level corresponds to the soft start time T2.

For example, referring to FIG. 5, the first current I1 and the second current I2 sum up into a relatively large current of about 28 µA to travel to the capacitor C. Therefore the voltage Vc charged on the capacitor C immediately surpasses the first reference voltage Vref1, and then the second reference voltage Vref2. At this time, in case where the second reference voltage Vref2 is 0.7V and the capacitor C is of about 1 µF, at about 23 msec from a time point that the capacitor C is charged by the sum current, the charged voltage Vc becomes higher than the second reference voltage Vref2 of 0.7V.

Therefore, the second comparator element 120 outputs a high level signal at power-on, and a low level signal with elapse of about 23 msec from a time point of power-on.

In the aforesaid process of controlling the soft start time T2, when the second comparator element 120 outputs a soft start signal SSS, which is a low level, the soft start signal SSS disables the first comparator element 120, enables the third comparator element 150 and turns off the first switch SW2.

Simultaneously, a logical operational element 142 of the current bypass controller 140 is enabled, a second switch SW2 of the current bypass controller 140 is turned on and the second current I2 of the second current source IS2 is blocked.

In a brief explanation of operation of the second switch SW2, when the logical operational element 142 is enabled, in case where a first protective signal SP and a second protective signal SP2 of a protective signal SP are at low levels, the logical operational element 142 outputs a low level signal and the second switch SW2 is active at a low level so that the second switch SW2 is turned on.

In this case, the second current I2 is blocked by the first switch SW1 and the first current I1 supplied from the first current source IS1 is bypassed to the ground through the second switch SW2. Thus no voltage is charged on the capacitor C.

As described above, after the soft start signal SSS is outputted, the system employing the circuit of the invention operates normally. At this time, the third comparator element 150 outputs a low level signal.

In this fashion, the system adopting the time control circuit of the backlight inverter according to the invention performs soft start normally and operates normally thereafter.

In case of errors in lamp operation such as openness of the backlight lamp, the error is detected and the protective signal SP based on the error detection is inputted to the time control circuit of the backlight inverter. Herein, the protective signal SP may include the first protective signal SP1 and the second protective signal. The first protective signal may be induced by lamp openness and the second protective signal SP2 may be induced by over-voltage or over-current.

Next, an explanation will be given about a process of controlling a shutdown time T3.

Referring to FIG. 4, during normal operation of the system, if the protective signal SP is inputted, the current bypass controller 140 of the invention blocks a bypass path of the current flowing to the ground through the connecting pin CP so that the first current I1 of the first current source IS1 travels to the capacitor C. At this time, the voltage charged on the capacitor is gradually incremented.

In a brief explanation for a process in which the current bypass path is blocked by the current bypass controller 140, when the logical operational element 142 is enabled, in case where the first protective signal SP1 or the second protective signal SP2 is at a high level (in case of lamp errors), the logical operational element 142 outputs a high level signal so that the second switch SW2 is active at a low level. Therefore, the second switch SW2 is turned off, blocking the bypass path of the current flowing to the ground through the connecting pin CP.

Then, in case where the zenor diode ZD of the constant voltage element 130 of the invention is set at about 4.0V, the charged voltage Vc is gradually raised to a constant voltage (e.g., 4.0V) set by the constant voltage element 130. If the charged voltage Vc surpasses the third reference voltage Vref3 applied to the inverse (−) terminal of the comparator 151 of the third comparator element 150, an output of the comparator 151 is transited from a low level to a high level. The high level is latched by the second latch 152 so that the third comparator 150 outputs a shutdown signal SSD, which is a high level.

As a result, the output of the shutdown signal SSD discontinues power supply after a predetermined time and shuts down a system employing the circuit of the invention.

As set forth above, a time control circuit of a backlight inverter applied to displays such as LCD according to preferred embodiments of the invention is configured such that an initial startup time, a soft start time and a shutdown time are controlled via an externally connectable capacitor for time-setting. This diminishes the number of externally connectable pins and thus reduces production costs.

While the present invention has been shown and described in connection with the preferred embodiments, it will be apparent to those skilled in the art that modifications and variations can be made without departing from the spirit and scope of the invention as defined by the appended claims.

What is claimed is:

1. A time control circuit for a backlight inverter comprising:
   a first current source connected between a connecting pin and a power terminal, for supplying a pre-set first current;
   a second current source for selectively supplying a pre-set second current to the connecting pin;
   a capacitor connected between the connecting pin and a ground, wherein the capacitor is configured to be charged by either: the first current source, or the first current source and the second current source;
   a first comparator element for comparing a voltage of the capacitor at the connecting pin and a pre-set first reference voltage to control an initial startup time;
   a second comparator element for comparing the voltage of the capacitor at the connecting pin and a pre-set second reference voltage to control a soft start time;
   a current bypass controller including a current bypass path formed between the connecting pin and the ground, for connecting the current bypass path after the soft start time and blocking the current bypass path at an input of a protective signal; and
   a third comparator element for comparing the voltage of the capacitor at the connecting pin and a pre-set third reference voltage to control a shutdown time;
   wherein
   the first comparator element and the second comparator element are configured to output a high voltage level at power-on,
   a first period, during which the output of the first comparator element is transited from the high level to a low level, corresponds to the initial startup time, and
   a second period, during which the output of the second comparator element is transited from the high level to the low level, corresponds to the soft start time.

2. The time control circuit for the backlight inverter according to claim 1, further comprising a constant voltage element connected to the connecting pin, for supplying a pre-set constant voltage.

3. The time control circuit for the backlight inverter according to claim 1, further comprising:
   a first switch connected between the second current source and the connecting pin and configured to disconnect the second current source from the connecting pin after the soft start time determined by the second comparator element;
   wherein the second current source has one end connected to the power terminal.

4. The time control circuit for the backlight inverter according to claim 1, wherein the second reference voltage is set higher than the first reference voltage and lower than the third reference voltage.

5. The time control circuit for the backlight inverter according to claim 2, wherein the constant voltage of the constant voltage element is set higher than the third reference voltage.

6. The time control circuit for the backlight inverter according to claim 1, wherein the first current of the first current source is set lower than the second current of the second current source.

7. The time control circuit for the backlight inverter according to claim 1, wherein the first comparator element is disabled after the soft start time determined by the second comparator element.

8. The time control circuit for the backlight inverter according to claim 1, wherein the second comparator element comprises a comparator for comparing the voltage of the capacitor and the second reference voltage, and a first latch for outputting an output signal from the comparator, the first latch being reset at power-off.

9. The time control circuit for the backlight inverter according to claim 1, wherein the third comparator element comprises a comparator for comparing the voltage of the capacitor and the third reference voltage, and a second latch for outputting an output signal from the comparator, the second latch being reset at power-off.

10. The time control circuit for the backlight inverter according to claim 1, wherein the bypass controller comprises a second switch connected between the connecting pin and the ground, and a logical operation element for logically summing up a first protective signal and a second protective signal to provide a switching signal to the second switch, the logical operation element being enabled after the soft start time determined by the second comparator element.

\* \* \* \* \*